(12) United States Patent
Shi et al.

(10) Patent No.: US 10,417,023 B2
(45) Date of Patent: Sep. 17, 2019

(54) GPU SIMULATION METHOD

(71) Applicant: MASSCLOUDS INNOVATION RESEARCH INSTITUTE (BEIJING) OF INFORMATION TECHNOLOGY, Beijing (CN)

(72) Inventors: Lei Shi, Beijing (CN); Hui Zhang, Beijing (CN); Dong Cheng, Beijing (CN); Wenqiang Niu, Beijing (CN)

(73) Assignee: MASSCLOUDS INNOVATION RESEARCH INSTITUTE (BEIJING) OF INFORMATION TECHNOLOGY, Beijing (CN)

( * ) Notice: Subject to any disclaimer, the term of this patent is extended or adjusted under 35 U.S.C. 154(b) by 242 days.

(21) Appl. No.: 15/339,491

(22) Filed: Oct. 31, 2016

(65) Prior Publication Data

US 2018/0121220 A1    May 3, 2018

(51) Int. Cl.
*G06F 9/455*    (2018.01)
*G06T 1/20*    (2006.01)

(52) U.S. Cl.
CPC .............. *G06F 9/455* (2013.01); *G06T 1/20* (2013.01)

(58) Field of Classification Search
CPC .............. G06F 9/455; G06T 1/60; G06T 1/20
See application file for complete search history.

(56) References Cited

U.S. PATENT DOCUMENTS

| 8,274,518 | B2* | 9/2012 | Blythe | ................ G06F 9/45537 345/522 |
| 2010/0214301 | A1* | 8/2010 | Li | .............................. G06T 1/20 345/522 |
| 2011/0102443 | A1* | 5/2011 | Dror | ........................ G06T 1/20 345/522 |

(Continued)

OTHER PUBLICATIONS

OED (practical). English Oxford Living Dictionaries [retrieved on Oct. 9, 2018]. Retrieved from <https://en.oxforddictionaries.com/definition/practical> (Year: 2018).*

(Continued)

*Primary Examiner* — Aniss Chad
*Assistant Examiner* — Alfred H B Wechselberger
(74) *Attorney, Agent, or Firm* — Oliff PLC

(57) ABSTRACT

A GPU simulation method. An instruction sequence of a client GPU is intercepted in a kernel state simulator based on system virtualization and GPU using principle, and a mechanism is selected according to user configuration to accomplish simulation of the client GPU. In first mechanism, instruction translation is accomplished on low-level semantics based on a binary translation technology, and instructions are executed on a host GPU; in second mechanism, instruction conversion is accomplished using an existing GPU software stack, and instructions are executed on host GPU. The method provides an efficient simulated GPU for a virtual machine based on a host machine physical GPU, and solves the problem of slow GPU simulation. Based on a system virtualization technology and by virtue of a convenient condition provided by an existing GPU software (Continued)

stack, the GPU simulation speed is improved, and the implementation difficulty and complexity of the method are effectively controlled.

8 Claims, 3 Drawing Sheets

(56) References Cited

U.S. PATENT DOCUMENTS

| | | | | |
|---|---|---|---|---|
| 2015/0029200 A1* | 1/2015 | Khosa | ............... | G06F 9/00 345/522 |
| 2015/0116310 A1* | 4/2015 | Baudouin | ............ | G06T 1/60 345/419 |
| 2016/0350245 A1* | 12/2016 | Shen | ............ | G06F 9/4843 |

OTHER PUBLICATIONS

OED (transparent). English Oxford Living Dictionaries [retrieved on Oct. 9, 2018]. Retrieved from <https://en.oxforddictionaries.com/definition/transparent> (Year: 2018).*

Suzuki et al. "GPUvm: Why Not Virtualizing GPUs at the Hypervisor?" Proceedings of USENIX ATC '14, Philadelphia, PA, pp. 109-120 [retrieved on Sep. 24, 2018] Retrieved from <https://www.usenix.org/sites/default/files/atc14_full_ proceedings_interior.pdf> (Year: 2014).*

Menychtas et al. "Enabling OS Research by Inferring Interactions in the Black-Box GPU Stack" 2013 USENIX Annual Technical Conference, pp. 291-296 [retrieved on Sep. 25, 2018]. Retrieved from <https://www.usenix.org/system/files/conference/atc13/atc13-menychtas.pdf> (Year: 2013).*

Suzuki et al. "GPUvm: GPU Virtualiation at the Hypervisor" IEEE Transaction on Computers, vol. 65, No. 9, pp. 2752-2766 [ retrieved on Sep. 24, 2018]. Retrieved from <https://ieeexplore.ieee.org/abstract/document/7349172> (Year: 2016).*

Tian et al. "A Full GPU Virtualization Solution with Mediated Pass-Through" Proceedings of USENIX ATC '14, Philadelphia, PA, pp. 121-132 [retrieved on Sep. 25, 2018]. Retrieved from <https://www.usenix.org/sites/default/files/atc14_full_proceedings_interior.pdf> (Year: 2014).*

Gupta et al. "GViM: GPU-accelerated Virtual Machines" Proceedings of the 3rd ACM Workshop on System-level Virtualization for High Performance Computing, Nuremberg, Germany, pp. 17-24 [retrieved on Oct. 10, 2018]. Retrieved from <https://dl.acm.org/citation.cfm?id=1519141> (Year: 2009).*

Dowty et al. "GPU Virtualization on VMware's Hosted I/O Architecture" USENIX Workshop on I/O Virtualization, December [ retrieved on Apr. 23, 2019]. Retrieved from <https://dl.acm.org/citation.cfm?id=1618534> (Year: 2008).*

* cited by examiner

GPU SIMULATION METHOD

FIELD OF THE INVENTION

The present invention relates to a graphical processing unit (GPU) simulation method.

BACKGROUND OF THE INVENTION

Central processing unit (CPU) simulation is often very slow. The virtualization technology is used for accelerating the CPU simulation, for example, SoftSDV and Simics of Intel can run based on a compatible CPU platform. Most instructions of new generation CPUs can directly run in old generation CPUs by using the virtualization technology, which is faster than solely software simulation technologies (e.g., binary translation of Qemu and interpretative translation of Bochs). Generally in the CPU field, most instructions of the new generation CPUs are consistent with those of the old generation CPUs, that is, backward compatibility is kept. However, the situation of the GPU field is different.

The operation on a GPU mainly includes two kinds:

1) accessing GPU registers, wherein the GPU generally includes a large amount of registers for controlling various running modes and states of the GPU, including display, rendering, power management and the like, and the GPU registers are generally mapped to a memory address space of a system in a memory mapped input/output (MMIO) mode; and 2) submitting GPU instructions, wherein the executions are generally stored in multiple circular buffers or batch buffers classified manner and then concurrently executed by rendering engines inside the GPU, and executing the instructions is a main working mode of the GPU.

The GPU simulation is more complex and slower than the CPU simulation:

Firstly, in the hardware design of the GPU seldom, support for virtualization is seldom considered. In contrast, nearly all existing CPUs have a characteristic of relatively perfect hardware-assisted virtualization. Thus, the GPU simulation is more difficult from the perspective of hardware characteristic support.

Secondly, the instruction design of the GPU does not guarantee sufficient backward compatibility as CPUs. When the GPU is upgraded, the semantics of instructions may be redefined. Thus, it becomes very difficult to directly run new generation GPU instructions in old generation GPUs, and vice versa.

SUMMARY OF THE INVENTION

The object of the present invention is to provide a GPU simulation method for solving the above technical problems, so that the problem of slow GPU simulation is solved by providing an efficient simulated GPU for a virtual machine based on a physical GPU of a host machine (the virtual GPU and the physical GPU may be different in model and version). In the present invention, mainly based on a system virtualization technology and by virtue of a convenient condition provided by an existing GPU software stack, the GPU simulation speed is improved, and the implementation difficulty and complexity of the method are effectively controlled.

In order to achieve the above object, the present invention adopts the following technical solutions:

The client GPU mentioned below is a GPU simulated by a virtual machine, and may simulate a GPU of any model in reality; and the client GPU driver is an unmodified original driver corresponding to the client GPU, and may be originated from a GPU manufacturer or an open source community.

The host GPU mentioned below is a physical GPU practically installed in a host machine, and the model of the GPU may be different from that of the simulated client GPU; and the host GPU driver is an unmodified original driver corresponding to the host GPU, and may be originated from a GPU manufacturer or an open source community.

A GPU simulation method includes the following steps:

step 101: in a virtual machine, an application program sending a high-level command to a client GPU driver;

step 102: the client GPU driver converting the high-level command submitted by the application program into a group of low-level instruction sequence that can be recognized by a corresponding client GPU, and then writing the low-level instruction sequence into a client GPU instruction cache; and step 103: the client GPU driver triggering a submission operation after a plurality of associated high-level commands are submitted, wherein the submission operation triggers the virtual machine to exit (VM-Exit), then the control right is transferred to a kernel state simulator, and the kernel state simulator decides on different mechanisms of GPU simulation according to configuration strategies.

The different mechanisms include:

a first type of mechanism: directly accomplishing instruction translation on low-level semantics based on a binary translation technology, and finally executing instructions on a host GPU; and a second type of mechanism: accomplishing instruction conversion and execution using an existing GPU software stack.

The existing GPU software stack includes all levels of software needed when the application program uses GPU hardware.

Only one or both of the first type of mechanism and the second type of mechanism may be adopted according to different actual situations.

The client GPU instruction cache is allocated with a memory space by the kernel state simulator and directly mapped to the virtual machine, and the action that the client GPU driver writes instructions into the client GPU instruction cache does not trigger the virtual machine to exit (VM-Exit).

The submission operation in step 103 is actually realized by setting the register state of the client GPU, the submission operation may trigger the virtual machine to exit (VM-Exit) according to the basic mechanism of system virtualization, the control right is transferred to the kernel state simulator, and then the kernel state simulator decides on the two mechanisms of GPU simulation.

If the first type of mechanism is selected in step 103, steps 201 and 202 are executed:

step 201: the kernel state simulator translating a current instruction sequence in the client GPU instruction cache into a corresponding recognizable instruction sequence of a host GPU based on binary translation, and storing the recognizable instruction sequence into a shadow instruction cache; and step 202: the kernel state simulator extracting the translated GPU instruction sequences from the shadow instruction cache, and submitting the translated GPU instruction sequences to the host GPU in batch; and the host GPU as a practical physical GPU accomplishing final GPU simulation work.

The instruction sequence after binary translation in step 201 is consistent with the instruction sequence before the translation in execution effect.

If the second type of mechanism is selected in step 103, step 301 to step 305 and an optimal bypass of step 401 are executed:

step 301: the kernel state simulator scanning the current instruction sequence in the client GPU instruction cache, and checking whether a corresponding cache entry already exists in the current instruction sequence through comparison with a built-in conversion cache; if so, directly executing step 401; otherwise, the kernel state simulator registering a record in the conversion cache, marking the current instruction sequence as to be converted, exiting a kernel state, returning the control right is to a user state simulator, and then proceeding to step 302;

step 302: the user state simulator extracting a client GPU instruction sequence to be converted from the conversion cache, looking up a built-in mapping table, and translating the low-level instruction sequence into a high-level command form;

step 303: the user state simulator calling a host GPU driver, and sending a high-level command to the host GPU driver;

step 304: the host GPU driver processing the high-level command and generating an instruction sequence corresponding to the host GPU, wherein the instruction sequence corresponding to the host GPU is intercepted by the kernel state simulator when being submitted from a host machine kernel to the host GPU, and is used for updating the record to be converted in the conversion cache;

step 305: submitting the host GPU instruction sequence by the host machine kernel to the host GPU for execution; and step 401: if the kernel state simulator discovers that a mapping entry between the current client GPU instruction sequence and the host GPU instruction sequence exists in the conversion cache, then the kernel state simulator directly using the mapping entry to accomplish conversion, and submitting a conversion result to the host GPU for execution.

In step 302, the mapping table is input an instruction sequence of the client GPU, and outputs a translated high-level command. The high-level command belongs to a high abstract level, and the translated high-level command is irrelevant to the new and old versions of the bottom layer GPU, so the user state simulator can directly process the high-level command in step 303.

The mapping table in step 302 needs to be pre-established by the following process: the application program sends a high-level command to the GPU driver, the high-level command is converted by the GPU driver into a group of low-level instruction sequence, which is temporarily stored in the batch cache and then submitted to the GPU for running. As shown in FIG. 3, a mapping table of a corresponding relation between any GPU instruction sequence and a high-level command can be established by monitoring the batch cache. The mapping table is established for the host GPU herein, and is loaded and used by the user state simulator during start-up.

A conversion entry from the client GPU instruction sequence to the host GPU instruction sequence is established in step 304, thereby providing support for accelerated conversion of step 401.

The intercepting process of step 304 is transparent for the host GPU driver.

The present invention has the following beneficial effects:

1, the present invention has an obvious advantage in simulation speed;

2, the present invention can simulate GPUs of various other models based on a GPU of a model; and 3, the present invention is low in implementation difficulty and complexity by means of the existing GPU software stack.

DETAILED DESCRIPTION OF THE EMBODIMENTS

The present invention will be further described below in combination with the accompanying drawings and the embodiments.

Although the instruction set executed by each manufacturer and by each generation of GPUs may be different, the design object of the instructions is similar, for example, the instructions may all designed to support high-level programming interfaces such as OpenGL or DirectX. The present invention is not limited by the manufacturer type of a display card and the high-level programming interface type; however, for further clear description, the implementation process of the present invention is illustrated below with OpenGL and DirectX display cards as an example.

Figure 1:
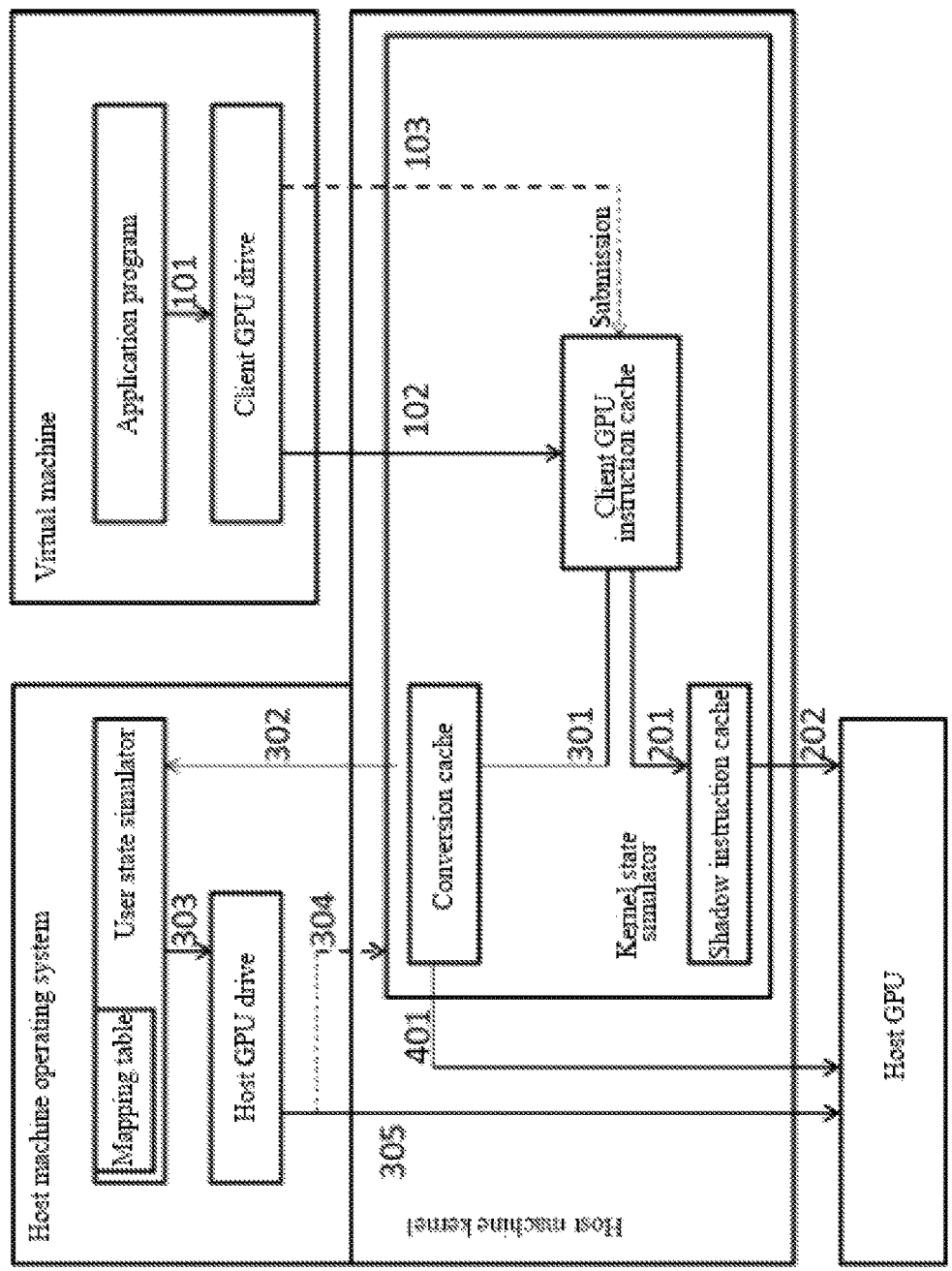
FIG. 1 shows a GPU simulation structure and a data flow for simulating a client GPU based on a host GPU.

As shown in FIG. 1:

Step 101: an OpenGL-based application program running in a virtual machine sends a high-level command to a client GPU driver. In this step, the application program and the client GPU driver are unmodified original programs, and their running processes are identical to those in physical environments.

Step 102: the client GPU driver converts the high-level command into a corresponding instruction sequence belonging to an instruction set of a client GPU. Then, the instruction sequence should be logically sent by the driver to the client GPU configured in the virtual machine, but is actually written into a client GPU instruction cache provided by a kernel state simulator due to virtualization. The client GPU instruction cache is directly mapped to the virtual machine, so this step does not trigger VM-Exit and nearly has no negative effect on the running performance of the virtual machine.

Step 103: the client GPU driver informs the GPU of executing submission once after sending out a group of high-level command, and the kernel state simulator intercepts the submission command and processes all instructions in the current client GPU instruction cache in batch. For a GPU of Intel, the submission is realized by setting a TAIL register of the GPU. The kernel state simulator intercepts the submission command by the method of removing mapping of a corresponding space of the TAIL register from a memory page table of the virtual machine, so that when the driver executes register operation on the GPU, the virtual machine is triggered to exit (VM-Exit), the control right is transferred to the kernel state simulator, and then the submission is intercepted. For subsequent steps of step 103, the kernel state simulator can select one or both of the following two paths for subsequent processing according to a configuration strategy, that is, different instruction sequences enter different subsequent flows according to the strategy. The first path is a method based on binary translation, including steps 201 and 202; and the other path is a method depending on a mapping table and a GPU software stack, including steps 301 to 305 and optimized step 401.

If the first type of mechanism, namely binary translation on low-level semantics, is selected, steps 201 and 202 are executed after step 103.

Step 201: the kernel state simulator translates a current instruction sequence in the client GPU instruction cache zone into a corresponding recognizable instruction sequence of a host GPU based on a binary translation technology, and stores the recognizable instruction sequence into a shadow instruction cache. The binary translation is a translation method based on an instruction block, and the translation efficiency can be improved by adopting an optimization method of resequencing instructions and eliminating redundant instructions.

Step 202: the kernel state simulator submits current GPU instructions in the shadow instruction cache to the host GPU in batch. Then, the kernel state simulator serving as a user of a physical GPU submits the instructions to the GPU, thereby accomplishing the simulation work.

If the second type of mechanism using the existing GPU software stack and optimal path is selected, steps 301 to 305 and an optimal bypass of step 401 are executed after step 103.

Step 301: the kernel state simulator checks a conversion cache according to the current instruction sequence in the client GPU instruction cache zone, and judges whether the instruction sequence has a corresponding cache entry or not. If so, step 401 is directly performed; otherwise, the kernel state simulator registers a record in the conversion cache, marks the instruction sequence as to be converted and exits a kernel state, the control right is returned to a user state simulator, and then step 302 is executed.

Step 302: the user state simulator extracts a client GPU instruction sequence to be converted from a conversion mapping table, and restores the group of low-level instruction sequence into a high-level command form. The restoring process is based on a pre-established mapping table, and the table is input the instruction sequence of the client GPU, and outputs a restored high-level command. In order to accelerate look-up of the mapping table, only a guide instruction in the instruction sequence should be firstly pre-matched with a data entry in the table. If the matching succeeds, the remaining sequences are further compared, so that the matching speed of the command mode can be improved.

Step 303: the user state simulator calls a host GPU driver, and sends a high-level command to it.

Step 304: the host GPU driver processes the high-level command sent by the user state simulator and generates an instruction sequence corresponding to the host GPU, wherein the instruction sequence is intercepted by the kernel state simulator when being submitted from a host machine kernel to the GPU, and is used for updating the record to be converted in the conversion cache and establishing a conversion entry from the client GPU instruction sequence to the host GPU instruction sequence. The intercepting process is transparent for the host GPU driver.

Step 305: the host GPU instruction sequence is submitted to the host GPU for executing by the host machine kernel Step 401: if the conversion cache currently has a mapping entry between the current client GPU instruction sequence and the host GPU instruction sequence, the kernel state simulator directly uses the mapping entry to accomplish conversion, and submits the conversion result to the host GPU for executing.

Figure 2:
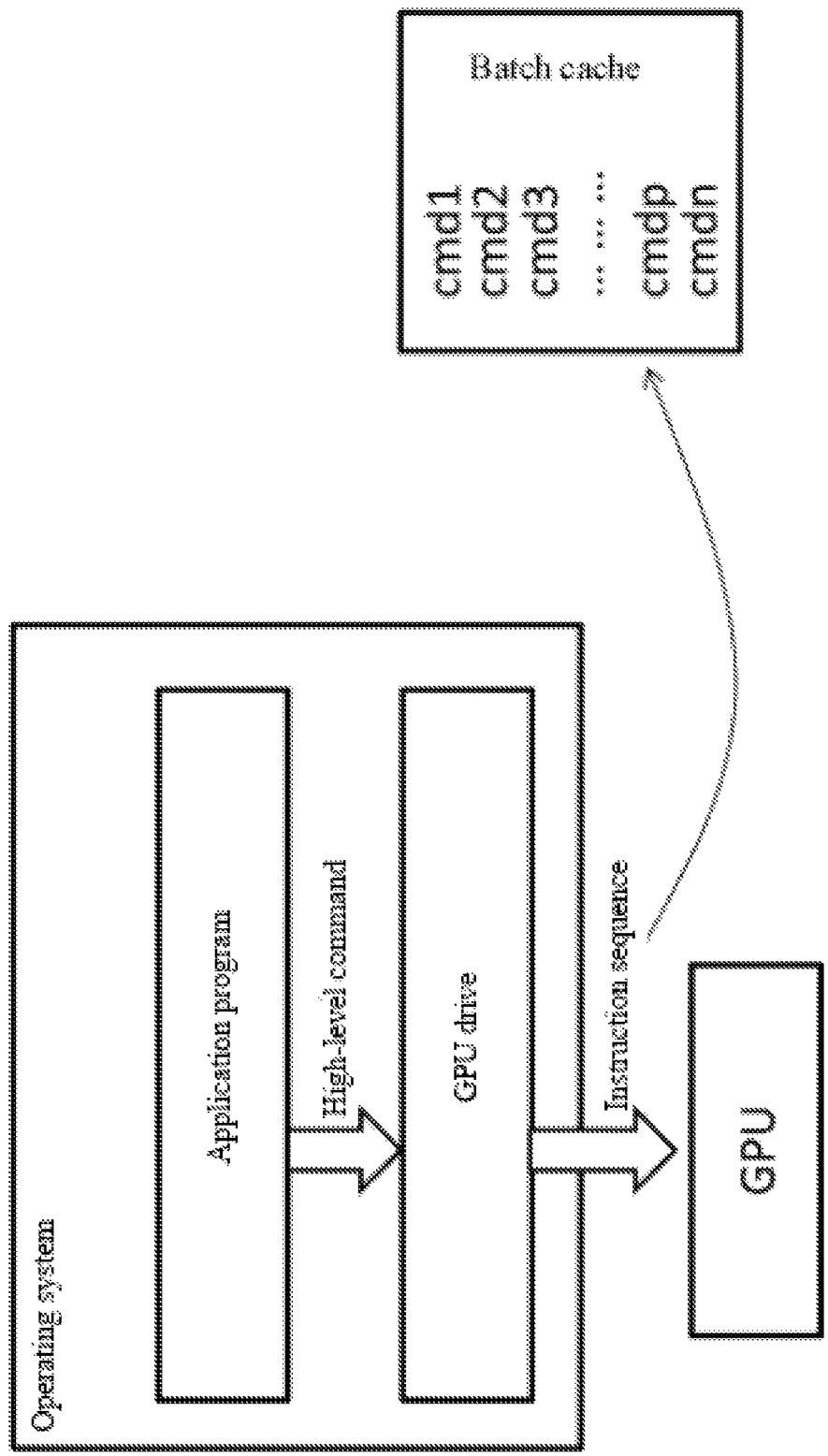
FIG. 2 shows a GPU software stack.
Figure 3:
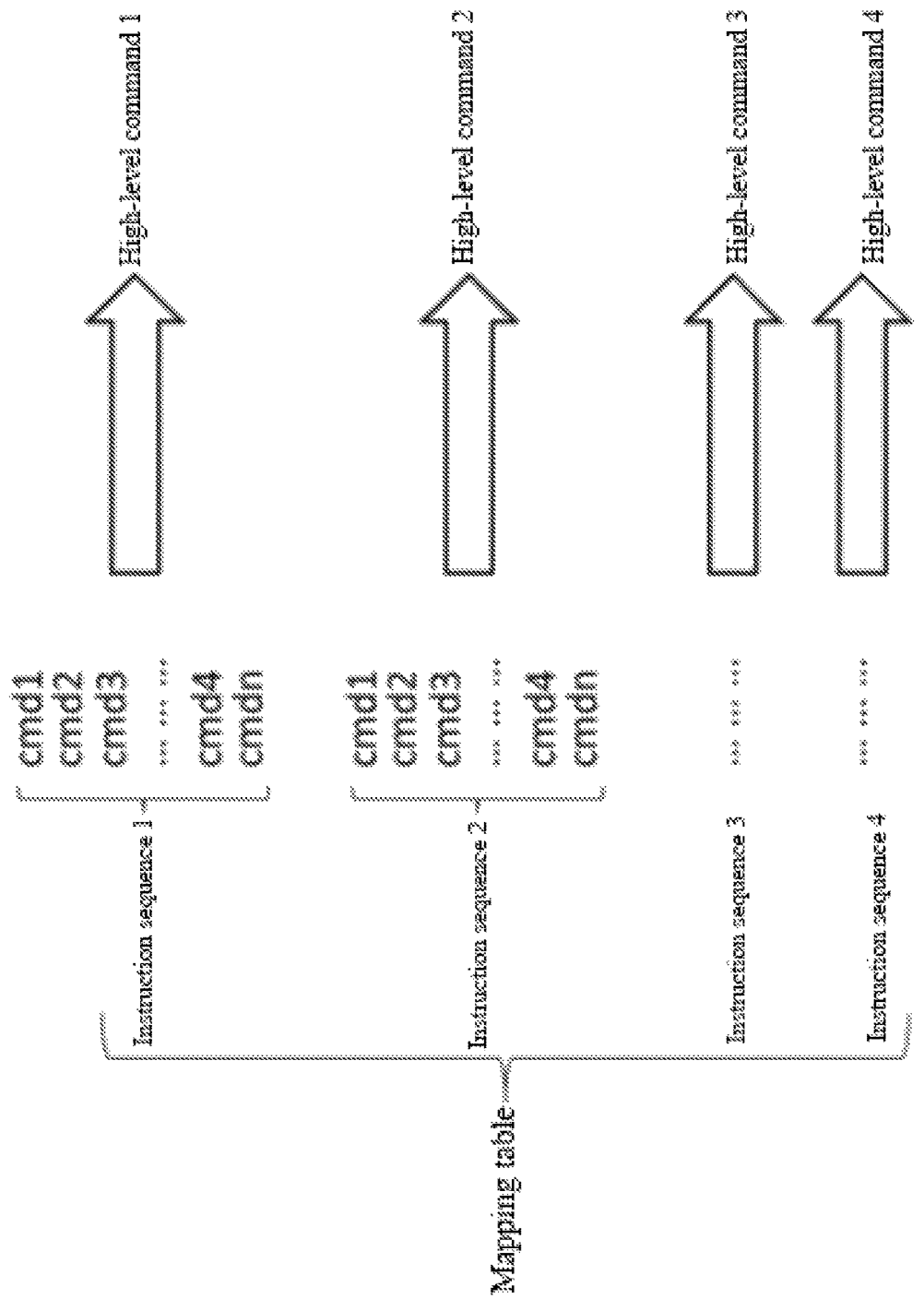
FIG. 3 shows a mapping table from GPU low-level instruction sequences to high-level commands.

In addition, the establishment principle of the mapping table in step 302 is shown in FIG. 2, a high-level command sent from the application program to the GPU driver is converted by the GPU driver into a group of low-level instruction sequence, which is temporarily stored in the batch cache and then submitted to the GPU for running. Thus, a mapping table can be established by monitoring a corresponding relation between the instruction sequence and the high-level command in the batch cache, as shown in FIG. 3. With OpenGL as an example, there are about 50 OpenGL high-level commands (API form) at present, so the workload of tracking mapping from the high-level commands to low-level instruction sequences is controllable. It should be noted that for a high-level command, different paths may be executed in the GPU software stack when call parameters are different, so multiple instruction sequence modes may be generated. Thus, the mapping table may have the situation of many-to-one mapping.

Although the specific embodiments of the present invention are described in combination with the accompanying drawings, the protection scope of the present invention is not limited thereto. It should be understood by those skilled in the art that various alterations or modifications made by them without any creative effort based on the technical solutions of the present invention should still fall into the protection scope of the present invention.

The invention claimed is:

1. A graphical processing unit (GPU) simulation method, comprising:

step 101: in a virtual machine, sending, by an application program, a high-level command to a client GPU driver;

step 102: converting, by the client GPU driver, the high-level command submitted by the application program into a group of low-level instruction sequence that can be recognized by a corresponding client GPU, and then writing the low-level instruction sequence into a client GPU instruction cache; and step 103: triggering, by the client GPU driver, a submission operation after a plurality of associated high-level commands are submitted, wherein the submission operation triggers the virtual machine to exit, then a kernel state simulator decides on different mechanisms of GPU simulation according to configuration strategies, wherein the different mechanisms comprise:

a first type of mechanism, which includes directly accomplishing instruction translation on low-level semantics based on a binary translation technology, and executing instructions on a host GPU; and a second type of mechanism, which includes accomplishing instruction conversion and execution using an existing GPU software stack, and wherein if the second type of mechanism is selected, then the method further comprises:

step 301: scanning, by the kernel state simulator, the current instruction sequence in the client GPU instruction cache, and determining whether a corresponding cache entry already exists in the current instruction sequence through comparison with a built-in conversion cache;

if a determination is made that the corresponding cache entry already exists in the current instruction sequence, then the method further comprises directly executing step 401;

if determination is made that the corresponding cache entry does not already exist in the current instruction sequence, then registering, by the kernel state simulator, a record in the conversion cache, marking the current instruction sequence as to be converted, exiting a kernel state, and then proceeding to step 302;

step 302: extracting, by the user state simulator, a client GPU instruction sequence to be converted from the conversion cache, looking up a built-in mapping table, and translating the low-level instruction sequence into a high-level command form;

step 303: calling, by the user state simulator, a host GPU driver, and sending a high-level command to the host GPU driver;

step 304: processing, by the host GPU driver, the high-level command, and generating an instruction sequence corresponding to the host GPU, wherein the instruction sequence corresponding to the host GPU is intercepted by the kernel state simulator when being submitted from a host machine kernel to the host GPU, and is used for updating the record to be converted in the conversion cache;

step 305: submitting the host GPU instruction sequence by the host machine kernel to the host GPU for execution; and step 401: if the kernel state simulator discovers that a mapping entry between the current client GPU instruction sequence and the host GPU instruction sequence exists in the conversion cache, then directly using, by the kernel state simulator, the mapping entry to accomplish conversion, and submitting a conversion result to the host GPU for execution.

2. The GPU simulation method of claim 1, wherein only one or both of the first type of mechanism and the second type of mechanism may be adopted according to different situations.

3. The GPU simulation method of claim 1, wherein
the client GPU instruction cache is allocated with a memory space by the kernel state simulator and directly mapped to the virtual machine, and writing, by the client GPU driver, the low-level instruction sequence instructions into the client GPU instruction cache does not trigger the virtual machine to exit.

4. The GPU simulation method of claim 1, wherein
the submission operation in step 103 is realized by setting a register state of the client GPU,
the submission operation may trigger the virtual machine to exit according to a mechanism of system virtualization, and
then the kernel state simulator decides on two mechanisms of GPU simulation.

5. The GPU simulation method of claim 1, wherein if the first type of mechanism is selected in step 103, then the method further comprises:
step 201: translating, by the kernel state simulator, a current instruction sequence in the client GPU instruction cache into a corresponding recognizable instruction sequence of a host GPU based on binary translation, and storing the recognizable instruction sequence into a shadow instruction cache; and
step 202: extracting, by the kernel state simulator, the translated GPU instruction sequences from the shadow instruction cache, and submitting the translated GPU instruction sequences to the host GPU in batch, the host GPU being physical GPU that accomplishes GPU simulation work.

6. The GPU simulation method of claim 5, wherein the recognizable instruction sequence obtained after translating the current instruction sequence based on binary translation in step 201 is consistent with the instruction sequence before translation occurred.

7. The GPU simulation method of claim 1, wherein in step 302, the mapping table is input an instruction sequence of the client GPU, and outputs a translated high-level command.

8. The GPU simulation method of claim 1, wherein a conversion entry from the client GPU instruction sequence to the host GPU instruction sequence is established in step 304, thereby providing support for accelerated conversion of step 401.

* * * * *